United States Patent
Goren et al.

(10) Patent No.: US 11,726,662 B2
(45) Date of Patent: Aug. 15, 2023

(54) MAINTAINING AN AVAILABILITY OF A STORAGE SYSTEM

(71) Applicant: VAST DATA LTD., Tel Aviv (IL)

(72) Inventors: Avi Goren, Tel Aviv (IL); Amir Miron, Tel Aviv (IL); Ido Yellin, Tel Aviv (IL); Asaf Levy, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 17/249,517

(22) Filed: Mar. 3, 2021

(65) Prior Publication Data

US 2022/0283712 A1 Sep. 8, 2022

(51) Int. Cl.
*G06F 3/06* (2006.01)

(52) U.S. Cl.
CPC .......... *G06F 3/0617* (2013.01); *G06F 3/0635* (2013.01); *G06F 3/0679* (2013.01)

(58) Field of Classification Search
CPC .... G06F 3/0653; G06F 3/0659; G06F 3/0617; G06F 3/0635; G06F 3/0679; G06F 3/067; G06F 11/07; G06F 11/0703; G06F 11/0709; G06F 11/0727; G06F 11/0787; G06F 11/0772

See application file for complete search history.

(56) References Cited

U.S. PATENT DOCUMENTS

| | | | |
|---|---|---|---|
| 6,813,682 B2* | 11/2004 | Bress | G06F 21/567 713/161 |
| 9,817,730 B1* | 11/2017 | Howard | G06F 11/1474 |
| 2009/0006795 A1* | 1/2009 | Bress | G06F 12/1416 711/E12.001 |
| 2015/0355961 A1* | 12/2015 | Lesartre | G06F 11/0781 714/57 |
| 2019/0141128 A1* | 5/2019 | Hallak | H04L 67/1097 |
| 2020/0257460 A1* | 8/2020 | Som | G06F 3/0623 |

OTHER PUBLICATIONS

IBM, "Overview of data objects," 2015, available: https://www.ibm.com/docs/en/zos/2.3.0?topic=odod-overview-data-objects.*

* cited by examiner

*Primary Examiner* — Tracy A Warren
(74) *Attorney, Agent, or Firm* — Reches Patents

(57) ABSTRACT

A method for maintaining an availability of a storage system, the method may include obtaining, by a control module of the storage system, problem related information generated by one or more compute nodes of the storage system, the problem related information is indicative of one or more problems associated with an execution of one or more storage operations; determining, by the control module and based on the problem related information, whether to forbid an execution of a storage operation of the one of more storage operations; and updating, by the control module, and based on the determining, a forbidden storage operation data structure that is accessible to the compute nodes of the storage system.

27 Claims, 4 Drawing Sheets

MAINTAINING AN AVAILABILITY OF A STORAGE SYSTEM

TECHNICAL FIELD

The present disclosure generally relates to the field of data storage, and more particularly to maintaining availability in storage systems.

BACKGROUND

A kernel panic is a measure taken by an operating system's kernel upon detecting a fatal error that risks the continuation of a safe execution. A kernel panic causes the server node that executes the operating system kernel, to halt execution. A kernel panic may occur as a result of a hardware failure, a software bug, corrupted data, and other unexpected scenarios.

In storage systems having multiple compute nodes, another compute node may take over the responsibilities of the failed compute node and will perform the same tasks that were supposed to be handled by the failed compute node.

However, if the compute node that took over the responsibilities of the failed compute node tries to re-execute the operation that caused the failure (or if the failed compute node tries to retry the execution after it is reboot), then another kernel panic may occur, leading to a second compute node failure, that disrupt the availability of compute nodes of the storage system.

SUMMARY

There may be provided a storage system, a method and a non-transitory computer readable medium for maintaining availability of nodes and data of a storage system.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
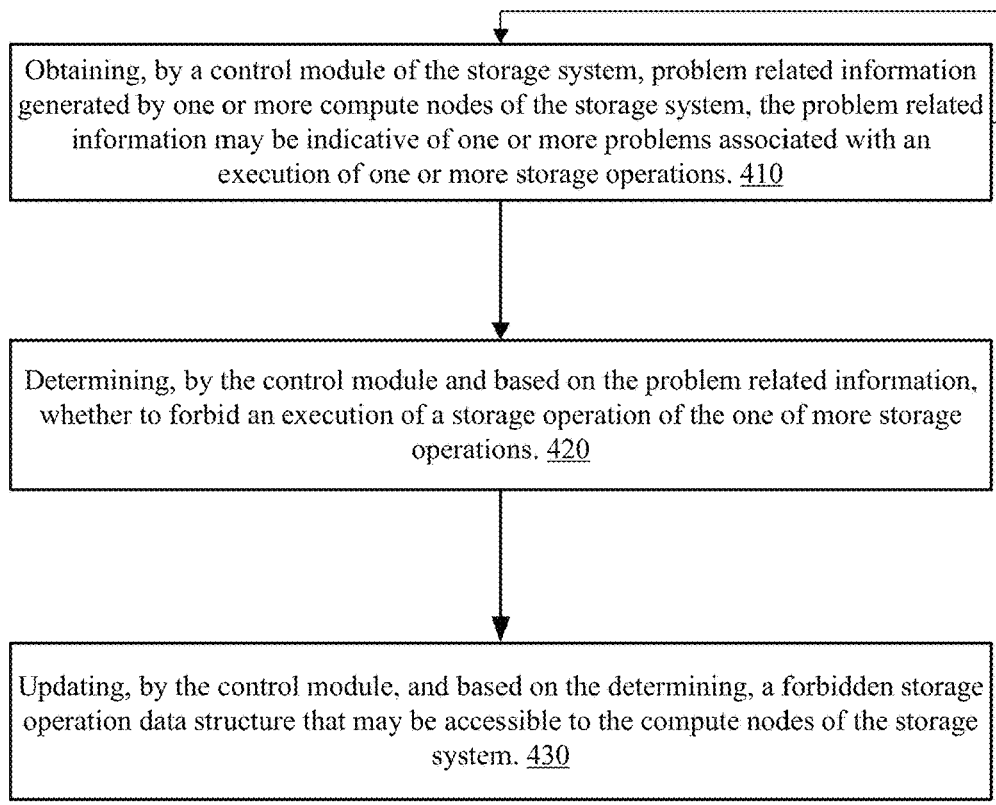
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

A large scale storage system may include tens, hundreds, thousands, hundred-thousands and even more storage nodes and tens, hundreds, thousands, hundred-thousands and even more compute nodes.

A storage node may include multiple storage devices such as a volatile storage device, and non-volatile storage devices. A storage device may include a Solid State Device (SSD), a non-volatile random access memory (NVRAM), a volatile random access memory (RAM), and the like.

Non-limiting examples of compute nodes and storage nodes are illustrated in US patent application 2019/0141128 which is incorporated herein by reference.

There is provided a storage system, method and a non-transitory computer readable medium for maintaining an availability of a storage system, for example by managing problems—for example by handling a forbidden storage operations data structure of storage operations that are denied from being executed in the storage system.

During the execution of various storage operations by compute nodes in a cluster of the storage system, the forbidden storage operations are identified as storage operations that caused at least once a severe problem that can damage the availability of the compute node, stop or otherwise corrupt the execution of storage operations by the compute node, or can compromise data integrity.

A newly identified forbidden storage operation is added to a forbidden storage operation data structure that is published by a control module, and is available to the compute nodes of the storage system, so that any compute node can check the forbidden storage operation data structure, and avoid performing a forbidden storage operation. A forbidden storage operation may be deemed allowed and/or removed from the forbidden storage operation data structure when it can be executed without damage—for example when the failure associated with the forbidden storage system operation is solved.

The forbidden storage operation may be (a) a specific storage operation, (b) any storage operation regarding to one or more storage spaces (the "any" storage operation indicates that the usage of (or access to) the one or more storage spaces is forbidden regardless of the storage operation type), (c) any storage operation regarding to a one or more resources of the storage system, (d) any storage system regarding one or more objects (such as a file, a part of a file, a directory of a file system), or any combination of two or more of a (a)-(d).

Examples of combinations—(i) a combination of a specific storage operation and one or more storage spaces, (ii) a combination of a specific storage operation and one or more resources of the storage system, (iii) a combination of a specific storage operation and one or more objects, (iv) a combination of a specific storage operation, one or more storage spaces and one or more resources of the storage system, (v) a combination of a specific storage operation, one or more storage spaces and one or more objects, (vi) a combination of a specific storage operation, one or more objects and one or more resources of the storage system, (vii) a combination of all storage operation, one or more storage spaces and one or more resources of the storage system, (iix) a combination of all storage operations, one or more storage spaces and one or more objects, (x) a combination of all storage operations, one or more objects and one or more resources of the storage system, (xi) a combination of a specific storage operation, one or more storage spaces, one or more storage system resources, and one or more objects, and (vi) a combination of all storage operations, one or more storage spaces, one or more storage system resources, and one or more objects.

The resources of the storage system may include storage nodes, storage devices of the storage nodes, write buffers, permanent storage resources, compute resources, compute cores, and the like. A forbidden storage operation may include (may be of the following types): a migration of data from one storage device to another storage device, defragmentation of storage spaces (e.g., RAID stripes, erase blocks), garbage collection, data reduction, accessing metadata, accessing data, accessing files, and any other storage operations that can cause or observed as causing a severe problem.

A storage space may include one or more logical address ranges, one or more physical address ranges, a storage space of one or more memory blocks, a storage space mapped to certain values of metadata (for example to keys), and the like.

When a compute node identifies a problem, it sends an alert reporting the problem to the control module.

The problem can be a crash of a compute node (e.g., kernel panic, or panic initiated by other code), a compute node error, data corruption or other integrity problem, or a problem that causes performance degradation.

There may be one or more control modules per the storage system or per a part of the storage system. The part of the storage system may include a group of compute nodes, a single compute node, one or more compute cores of the compute node, and the like.

The alert may include problem related information about a storage operation that is related to the problem. The problem related information may include a problem related storage operation type information, and at least one of (a) problem related storage space information about the storage space accessed when the problem occurred, (b) problem related storage system resource information regarding any resource of the storage system used when the problem occurred, and (c) problem related object that was accessed or otherwise utilized during the storage operation.

To be able to collect problem related information upon a compute node crash, the compute nodes are configured, when starting a storage operation, to write (for example update a log) storage operation related information such as storage operation type information, and at least one of (a) storage space information about the storage space to be accessed during the execution of the storage operation, and (b) storage system resource information regarding any resource of the storage system to be used during the execution of the storage operation. The information may be stored in the compute node.

Upon encountering a problem (even a panic)—the compute node attempts (before crashing) to write the storage operation related information and/or problem related information to a non-volatile storage, or publish outside the compute node—for example report to another compute node, to the control module, writing to a shared storage space, and the like.

The compute node may output the storage operation related information only when a problem occurred—so that the storage operation related information may be regarded as problem related information.

The compute node may output the storage operation related information in a manner (for example using a flag, an indicator, using a certain protocol or format) that indicates that the storage operation related information should be regarded as problem related information.

The control module may access the storage operation related information and/or problem related information in any manner—for example read a data structure of alerts and/or of problem related information and/or of storage operation information.

It should be noted that another compute node may detect a failure of the compute node executing the storage operation. The detection may include monitoring the status of the compute node, detecting that the compute node gained access to a resource and maintained the access for a period of time that exceeds an expected time, and the like.

The control module may be configured to calculate problem related metadata such as problem related statistics on the occurrences of the problems. The statistics may include the number of occurrences of a problem within a time window. The statistics may be gathered per storage operation type, per object, per one or more storage spaces, per one or more resources of the storage system, or any combination thereof.

The control module may apply one or more rules on the problems and/or on the problem related metadata, to identify a forbidden storage operation.

A problem may trigger adding a forbidden storage operation to the forbidden storage operation data structure, when the problem on its own, or in view of the problem related metadata about the problem, conforms to a defined rule. For example, instances of the same problem occurred more than a certain number of times during a certain time period. The rule may define whether the forbidden storage operation is a storage task related to one or more specific storage space and/or to one or more storage system resource and/or one or more objects or to a storage operation that is forbidden per-se.

Example of Rules:
a. A certain number (e.g. 3) of problems during executions a specific storage operation and specific storage space within a certain time window (e.g., an hour). The specific storage operation in association with the specific storage space will be added to the forbidden storage operation data structure, and denied from execution.
b. A certain number of problems that depends on the number of compute nodes (e.g., [number of compute nodes in a cluster]*factor (e.g., 1.5) for a specific storage operation, regardless of the storage space, within a certain time window—the specific storage operation will be added to the forbidden storage operation data structure, and denied from execution, for any storage space or object.
c. A certain number of problems when accessing a specific storage system object—such as a filesystem element (file, directory, object) during any storage operation, within a certain time window—the filesystem element will be added to the forbidden storage operation data structure, and denied from being accessed.

The rules may further define that a single occurrence of a specific problem can trigger defining the storage operation as forbidden immediately, without gathering statistics about further occurrences, i.e., the forbidden storage operation is added to the forbidden storage operation data structure immediately and denied from being executed immediately. Examples of problems that trigger immediately adding a storage operation to the forbidden storage operation data structure may be: a panic, data corruption, and any other problem that caused a compromised availability of a node or data.

The rules may further define dependencies among forbidden storage operations, and optionally, in a combination with a dependency in a certain system condition. For example, if a certain storage operation is added to the forbidden storage operation data structure, another storage operation may be further added to the data structure. A forbidden storage operation may be directly linked to a problem—thus it may have caused a problem (either per se, or in combination with one or more storage space and/or in combination with one or more object and/or one or more resource). Another forbidden storage operation may not be directly linked to a problem—but may be associated (directly or indirectly linked) with a forbidden storage operation that is directly associated with a problem.

For example, assuming that there is a defragmentation process that facilitates freeing space in SSD devices, so that data stored in a temporary storage memory can be migrated to the free space. Suppose the defragmentation process is forbidden (for example directly linked with a problem), the migration of the data can continue, as long as there is enough space in the SSDs. Suppose that a minimal free space in the SSDs is essential for keeping the SSDs healthy and functioning, then when the free space drops below a certain threshold, while the defragmentation is forbidden, then—the migration of data from the temporary storage memory into the SSDs—is also forbidden (indirectly linked with a problem).

As for another example, suppose that when trying to read metadata related to a file, it is determined that the metadata is corrupted. The file may be immediately defined as a forbidden context. In addition, a defragmentation process related to the specific address ranges associated with the metadata, may also be defined as forbidden, so as not to erase storage spaces that could be restored so as to recover the corrupted data or at least an older version of the data.

It should be noted that once a compute node fails, the responsibilities (including responsibility to execute one or more storage operations of the failed compute node) to of the compute node may be transferred to another compute node. That other compute node may receive an indication that the previous compute node failed and may operate in a safe mode in which it stores or sends outside the compute node storage operation information before executing each storage operation that was previously under the responsibility of the failed compute node.

It should be noted that the rules may take into account the estimated and/or actual damage or risk from a problem. This may require estimating the risk/damages associated with problems. For example stored information corruption may be regarded as more severe than a problem that merely delayed the execution of a storage system.

It should be noted that the control module may re-evaluate the load imposed on the compute nodes of the storage system in view of the forbidden storage operation data structure—for example ignore load associated with forbidden storage operation—and reallocate the load on the compute nodes accordingly. The reevaluation may also take place once a previously forbidden storage operation is freed and not regarded as a forbidden storage operation.

FIG. 1 illustrates method 400 for managing problems in a storage system.

Method 400 may start by step 410 of obtaining, by a control module of the storage system, problem related information generated by one or more compute nodes of the storage system, the problem related information may be indicative of one or more problems associated with an execution of one or more storage operations.

Step 410 may be followed by step 420 of determining, by the control module and based on the problem related information, whether to forbid an execution of a storage operation of the one of more storage operations.

Step 420 may include determining that a certain storage operation is forbidden, based on the problem related information. Step 420 may also include determining that another storage operation may be forbidden, based on a linkage between the other storage operation and the certain storage operation. The certain storage operation may be directly linked to a problem while the another storage operation may be not directly linked to the problem. Step 420 may also evaluate whether storage operations linked indirectly (through one or more iterations) to the certain storage operation should be forbidden.

Step 420 may include forbidding a forbidden storage operation that may be (a) a specific storage operation, (b)

any storage operation regarding to a one or more storage spaces (the "any" storage operation indicates that the usage of the one or more storage spaces is forbidden regardless of the storage operation type), (c) any storage operation regarding to a one or more resources of the storage system, (d) any storage operation regarding one or more objects (such as a file, a part of a file, a directory of a file system), or any combination of two or more of a (a)-(d).

Step 420 may be applied in any manner. For example—step 420 may include determining at least one frequency of occurrence of the one or more problems associated with the execution with one or more storage operations. Yet for another example—step 420 may be based on a risk or damage associated with a problem that occurred when executing the storage operation. Yet for a further example—the determining may include obtaining problem related statistics on the occurrences of the problems, and applying one or more rules to determine whether to forbid the execution of one of the one of more storage operations.

Step 420 may be followed by step 430 of updating, by the control module, and based on the determining, a forbidden storage operation data structure that may be accessible to the compute nodes of the storage system. The forbidden storage operation data structure may be accessible to the compute nodes by any mean of publishing, for example: publishing by sending the forbidden storage operation data structure to the compute nodes via a communication fabric that couples the compute nodes and the control module, or by writing the forbidden storage operation data structure to a shared storage space accessible to all the compute nodes.

If, for example, step 420 includes determining that a storage operation should be forbidden then step 430 may include adding that storage operation to the forbidden storage operation data structure.

Figure 2:
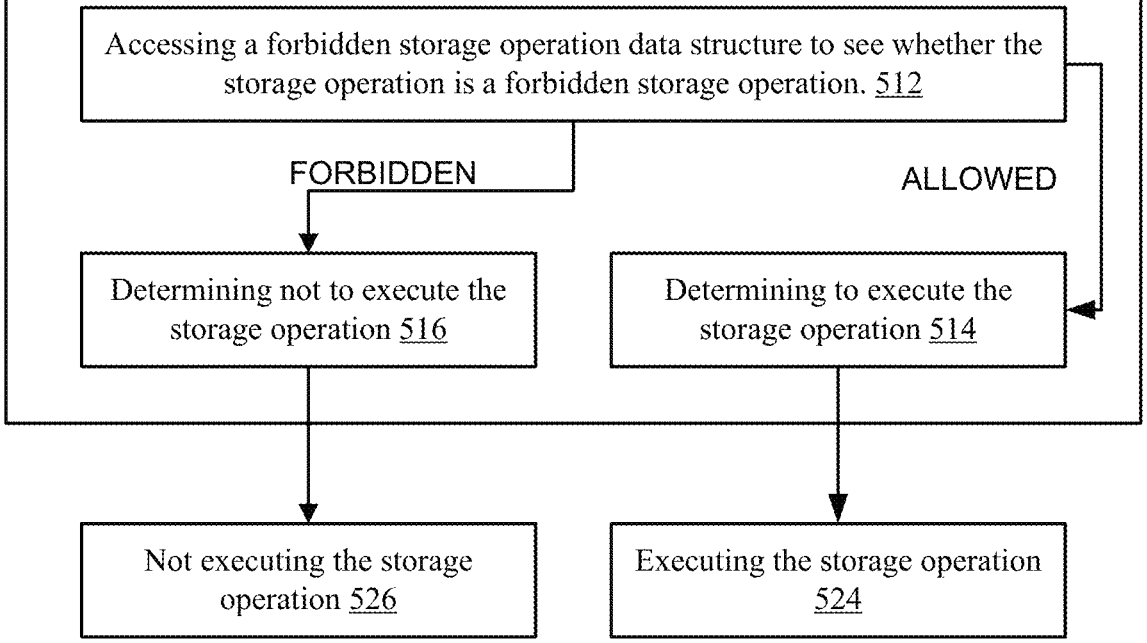
FIG. 2 illustrates an example of a method.

FIG. 2 illustrates method 500 for operating a compute node of a storage system.

Method 500 may include step 510 of determining, by a compute node of the storage system whether to execute a storage operation. The determination may be a part of a workload management of the compute node, may be triggered by a request from a control module to execute a shard that may include the storage operation, by receiving a request from a client computer coupled to the compute node, by routinely performing background storage operations that are under the responsibility of the compute node.

The compute node may or may not be the compute node that reported a problem that caused the storage operation to be forbidden.

Step 510 may include step 512 of accessing a forbidden storage operation data structure to see whether the storage operation is a forbidden storage operation.

If so—step 512 may be followed by step 516 of determining not to execute the storage operation.

If not—step 512 may be followed by step 514 of determining to execute the storage operation.

Step 514 may be followed by step 524 of executing the storage operation. Step 514 or step 524 may include logging the storage operation information (e.g., storage operation type and metadata) before the executing.

Step 516 may be followed by step 526 of not executing the storage operation. Step 526 may include sending an indication about not executing the storage operation.

Figure 3A:
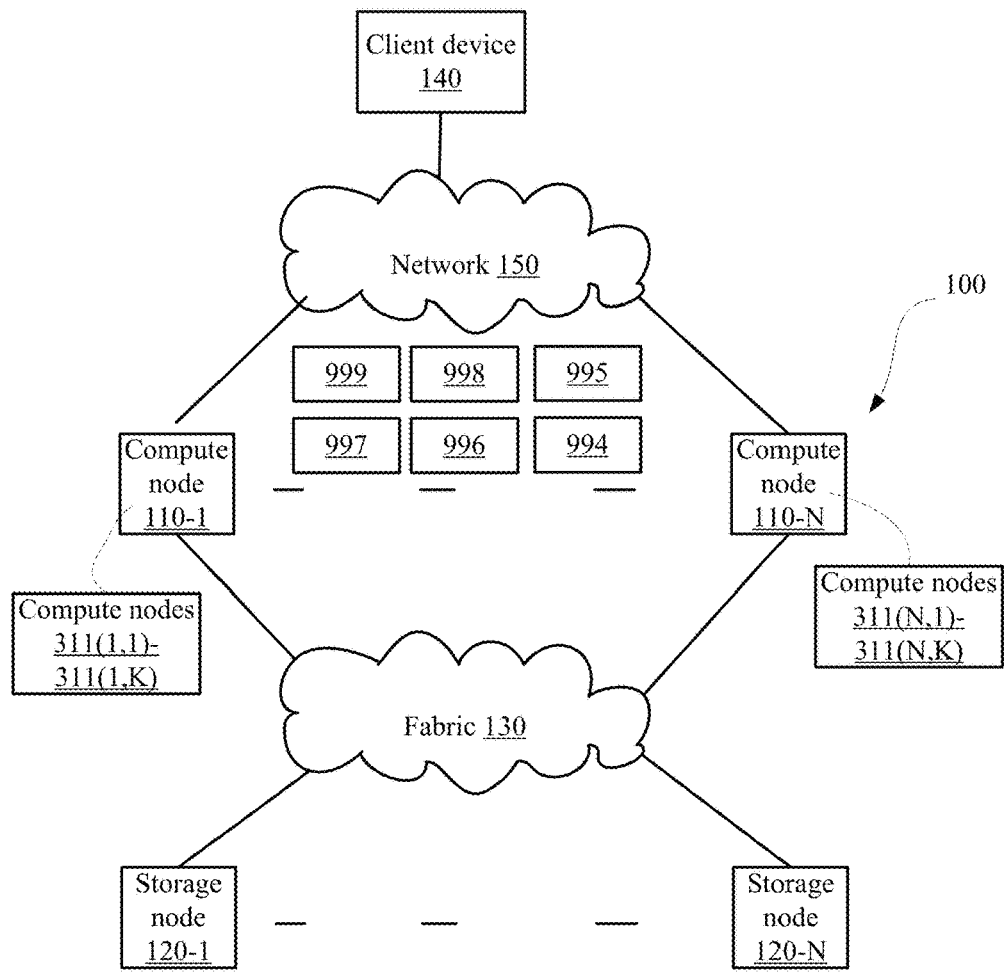
FIG. 3A is an example of a storage system.

FIG. 3A shows an example diagram of a storage system 100 according to the disclosed embodiments.

The storage system 100 includes a number of N compute nodes 110-1 through 110-N (hereinafter referred to individually as a compute node 110 and collectively as compute nodes 110, merely for simplicity purposes, N is an integer equal to or greater than 1). The compute nodes include (or may execute) multiple compute cores each—see for example compute nodes 311(1,1)-311(1,K) and compute nodes 311(N,1)-311(N,K).

The storage system 100 also includes a number of M storage nodes storage node 120-1 through 120-M (hereinafter referred to individually as a storage node 120 and collectively as storage nodes 120, merely for simplicity purposes, M is an integer equal to or greater than 1). The computer nodes 110 and the storage nodes 120 are connected through a communication fabric 130. M may equal N or may differ from N.

In an embodiment, a compute node 110 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 110 does not require any dedicated hardware. An example arrangement of a compute node 110 is provided in FIG. 3D.

A compute node 110 is configured to perform tasks related to the management of the storage nodes 120. In an embodiment, each compute node 110 interfaces with a client device 140 (or an application installed therein) via a network 150. To this end, a compute node 110 is configured to receive requests (e.g., read or write requests) and promptly serve these requests in a persistent manner. The network 150 may be, but is not limited to, the Internet, the world-wide-web (WWW), a local area network (LAN), a wide area network (WAN), and the like.

In an embodiment, a compute node 110 is configured to interface with different protocols implemented by the client devices or applications (e.g., TCP/IP, HTTP, FTP, etc.) and to manage the read and write operations to the storage nodes 120. The compute node 110 is further configured to translate the protocol commands into a unified structure (or language). Then, each compute node 110 is also configured to logically address and map all elements stored in the storage nodes 120.

Further, each compute node 110 may maintain the logical operations of elements and the relationships between the elements (for example, directory trees) and an element attribute (e.g., metadata) via state stored on the storage nodes 120. An element may include a file, a directory, an object, and the like. The mapping and addressing of the elements allow the compute node 110 to maintain the exact physical locations of the elements in the storage nodes 120.

In an embodiment, to efficiently read and write data to the storage nodes 120 from the physical layer, each compute node 110 performs a number of processes including data reduction, data resiliency, and Flash memory management actions (e.g., defrag, wear leveling, and so on).

It should be noted that each compute node 110 may operate in the same manner as all other compute nodes 110. In a case of a failure, any compute node 110 can replace the failed node. Further, each compute node may control and manage one or mode storage nodes 120 regardless of the specific architecture of the storage nodes 120. Therefore, there is no coupling between specific compute nodes 110 and specific storage nodes 120. As such, compute nodes can be added to the system 100 without increasing the number of storage nodes (or their capacity), and vice versa, storage nodes can be added without increasing the number of compute nodes 110.

The storage nodes 120 provide the storage and state in the system 100. To this end, each storage node 120 may include a plurality of SSDs which may be relatively inexpensive.

The storage nodes 120 may be configured to have the same capacity as each other or different capacities from each other. In an embodiment, the data stored in each storage node 120 is made redundant internally within the storage node, made redundant at a different storage node, or both. As will be discussed below with reference to FIGS. 3C and 3D, each storage node 120 further includes a non-volatile random-access memory (NVRAM) and an interface module for interfacing with the compute nodes 110.

A storage node 120 may be configured to communicate with the compute nodes 110 over the communication fabric 130. It should be noted that each compute node 110 can communicate with each storage node 120 over the communication fabric 130. There may not be a direct coupling between a compute node 110 and storage node 120.

In the embodiment, the communication fabric 130 may include an Ethernet fabric, an InfiniBand fabric, and the like. Specifically, the communication fabric 130 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

It should be noted that in one example deployment, the client device 140 is part of a computer node 110. In such a deployment, the system 100 does not communicate with an external network, e.g., the network 150. It should be further noted that the communication between the compute nodes 110 and the storage nodes 120 is always facilitated over the fabric 130. It should be further noted that the compute nodes 120 can communicate with each other over the fabric 130. The fabric 130 is a shared fabric.

FIG. 3A also illustrates a control module 997 and also a load monitor 998 and a load balancer 999. The control module 997 may perform load balancing and/or monitoring—but FIG. 3A illustrates the control module as not performing these tasks. The control module 997 may access and/or update a forbidden storage operation data structure 996 (that may be accessed by any of the compute nodes, either directly or accessing a copy of the forbidden storage operation data structure that is sent by the control module to the compute nodes), may access and/or update problem related information 995, storage operation metadata 994, problem related metadata 993, and the like.

The load balancer 999, the control module 997, and the load monitor 998 may be included in one of the compute nodes, may be located outside any of the compute nodes, may be combined, may include one or more compute cores, may be executed by one or more compute cores, and the like. There may be more than a single load balancer and a single load monitor.

Figure 3B:
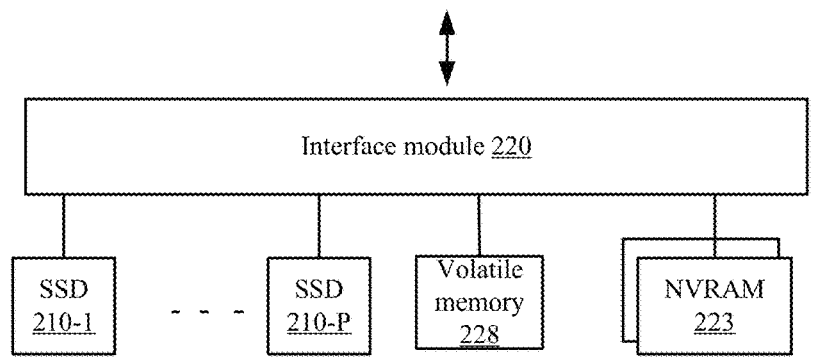
FIG. 3B is an example of a storage node.

FIG. 3B shows an example block diagram illustrating a storage node 120 according to an embodiment. The storage node 120 includes a plurality of storage devices such as SSDs 210-1 through 210-P (hereinafter referred to individually as an SSD 210 and collectively as SSDs 210, merely for simplicity purposes), at least one NVRAM, and an interface module 220.

According to the disclosed embodiments, the NVRAM 223 is utilized to reduce the number of write accesses to the SSDs 210 and the write amplification. According to an embodiment, data is written first to the NVRAM 223, which returns an acknowledgement after each such data write. Then, during a background process, the data is transferred from the NVRAM 223 to the SSDs 210. The data may kept in the NVRAM 223 until the data is completely written to the SSDs 210. Furthermore, this writing procedure ensures no data is lost when power is off.

As the NVRAM 223 supports low write latency and parallel writes, the storage node 120 supports these features. Specifically, the low latency is achieved by acknowledging the write request once the data is saved to the NVRAM 223. The parallel writes are achieved by serving multiple concurrent write requests by the NVRAM 223 and, during the background process, independently fulfilling such requests by saving the data into the SSDs 210.

Figure 3C:
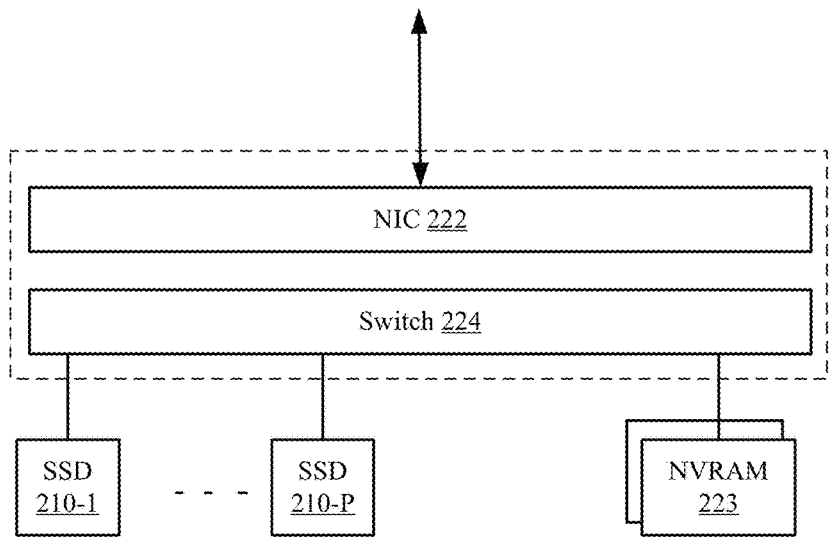
FIG. 3C is an example of an interface module of a storage node.

FIG. 3C shows an example block diagram of an interface module 220. In an example embodiment, an interface module 220 includes a network interface card (NIC) 222 and a switch 224 connected through an internal bus (not shown), e.g., a PCIe bus.

The NIC 222 allows the communication of the storage node 120 with the compute nodes (110, FIG. 3A) over the communication fabric (130, FIG. 3A). The NIC 222 may allow communication via at least one of the protocols discussed above.

The switch 224 allows the connection of the multiple SSDs 210 and NVRAM 223 to and NIC 222. In an example embodiment, the switch 224 is a PCIe switch. In another embodiment, more than one PCIe switch is utilized to support more connectivity to the SSDs. In some configurations, where non PCIe SSDs 210 are available (e.g., Ethernet SSDs), the switch 224 may be a non PCIe switch, for example an Ethernet switch.

Figure 3D:
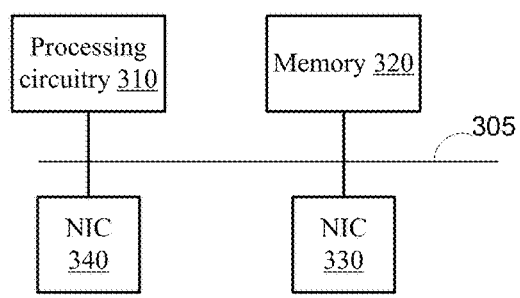
FIG. 3D is an example of a compute node.

FIG. 3D shows an example block diagram illustrating a compute node 110 according to an embodiment. The compute node 110 includes a processing circuitry 310, a memory 320, a first network interface controller (NIC) 330 and a second NIC 340. In an embodiment, the components of the compute node 110 may be communicatively connected via a bus 305.

The processing circuitry 310 may be realized as one or more hardware logic components and circuits. For example, and without limitation, illustrative types of hardware logic components that can be used include a field programmable gate array (FPGA), an Application Specific Integrated Circuit (ASIC), an Application Specific Standard Product (ASSP), a System On Chip (SOC), a general-purpose microprocessor, a microcontroller, a Digital Signal Processor (DSP), a neural network processor, and the like, or any other hardware logic components that can perform calculations or other manipulations of information.

The memory 320 may be volatile (e.g., RAM, etc.), non-volatile (e.g., ROM, flash memory, etc.), or a combination thereof. In one configuration, computer readable instructions or software to implement one or more processes performed by compute node 110 may be stored in the memory 320. Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

The first NIC 330 allows the compute node 110 to communicate with the storage nodes via the communication fabric 130 (see FIG. 3A) to provide remote direct memory access to data stored in the storage nodes. In an embodiment, the first NIC 130 may enable communication via RDMA protocols such as, but not limited to, InfiniB and, RDMA over Converged Ethernet (RoCE), iWARP, and the like.

The second NIC 340 allows the compute node 110 to communicate with client devices (e.g., client device 140, FIG. 3A) through a communication network (e.g., the network 150, FIG. 3A). Examples for such a network includes, but is not limited to, the Internet, the world-wide-web (WWW), a local area network (LAN), a wide area network (WAN), and the like. It should be appreciated that in some configurations, the compute node 110 may include a single NIC. This configuration is applicable when, for example, the fabric is shared.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for maintaining an availability of a storage system, the method comprising:
   obtaining, by a control module of the storage system, problem related information generated by one or more compute nodes of multiple compute nodes of the storage system, the problem related information is indicative of one or more problems that occurred in response to an execution of one or more storage operations by the one or more compute nodes;
   determining, by the control module and based on the problem related information, whether to forbid an execution of a storage operation of the one of more storage operations, wherein the determining further includes determining whether to forbid an execution of another storage operation, based on dependencies between the storage operation and the other storage operation, wherein a type of the storage operation differs from a type of the other storage operation; and wherein the determining includes determining whether to add the storage operation and the other storage operation to a forbidden storage operation data structure that includes storage operations whose execution is forbidden after being added to the forbidden storage operation data structure; and updating, by the control module, and based on the determining, the forbidden storage operation data structure that is accessible to the multiple compute nodes of the storage system.

2. The method according to claim 1 wherein the determining comprises determining that the storage operation and the other storage operation are forbidden.

3. The method according to claim 1 wherein the determining comprises obtaining problem related statistics on the occurrences of the one or more problems, and applying one or more rules to determine whether to forbid the execution of one of the one of more storage operations.

4. The method according to claim 1 wherein the determining whether to forbid the execution of the storage operation comprises determining whether to forbid a certain type of storage operation.

5. The method according to claim 1 wherein the determining whether to forbid the execution of the storage operation comprises determining whether to forbid the storage operation when applied on one or more storage spaces of the storage system.

6. The method according to claim 1 wherein the determining whether to forbid the execution of the storage operation comprises determining whether to forbid the storage operation when applied on one or more objects.

7. The method according to claim 1 wherein the determining whether to forbid the execution of the storage operation comprises determining whether to forbid the storage operation when the storage operation utilizes one or more resources of the storage system.

8. The method according to claim 1 wherein the determining whether to forbid the execution of the storage operation comprises determining whether to forbid any storage operation when applied on one or more objects.

9. The method according to claim 1 wherein the determining whether to forbid the execution of the storage operation comprises determining whether to forbid any storage operation when utilizes one or more resources of the storage system.

10. The method according to claim 1 wherein the determining whether to forbid the execution of the storage operation comprises determining at least one frequency of occurrence of the one or more problems associated with the execution with one or more storage operations.

11. The method according to claim 1 wherein the determining of whether to forbid the execution of the storage operation is based on a risk or damage associated with a problem that occurred when executing the storage operation.

12. The method according to claim 1 wherein the determining of whether to forbid the execution of the storage operation comprises determining to forbid the storage operation that is directly linked with a problem and determining to forbid another storage operation that is not directly linked with the problem, based on an association between the storage operation and the other storage operation.

13. The method according to claim 1, comprising denying an execution of a forbidden storage operation by a compute node that does not belong to the one or more compute nodes that generated the problem related information.

14. A non-transitory computer readable medium for maintaining an availability of a storage system, the non-transitory computer readable medium stores instructions for:

obtaining, by a control module of the storage system, problem related information generated by one or more compute nodes multiple compute nodes of the storage system, the problem related information is indicative of one or more problems that occurred in response to an execution of one or more storage operations by the one or more compute nodes;

determining, by the control module and based on the problem related information, whether to forbid an execution of a storage operation of the one of more storage operations, wherein the determining further includes determining whether to forbid an execution of another storage operation, based on dependencies between the storage operation and the other storage operation, wherein a type of the storage operation differs from a type of the other storage operation; and wherein the determining includes determining whether to add the storage operation and the other storage operation to a forbidden storage operation data structure that includes storage operations whose execution is forbidden after being added to the forbidden storage operation data structure;

updating, by the control module, and based on the determining, the forbidden storage operation data structure that is accessible to the multiple compute nodes of the storage system.

15. A control module of a storage system, the control module comprises at least one processing circuit and a memory module, the control module is configured to:

obtain problem related information generated by one or more compute nodes of multiple compute nodes of the storage system, the problem related information is indicative of one or more problems that occurred in response to an execution of one or more storage operations;

determine, based on the problem related information, whether to forbid an execution of a storage operation of the one of more storage operations, wherein the determining further includes determining whether to forbid an execution of another storage operation, based on dependencies between the storage operation and the other storage operation, wherein a type of the storage operation differs from a type of the other storage operation; and wherein the determining includes determining whether to add the storage operation and the other storage operation to a forbidden storage operation data structure that includes storage operations whose execution is forbidden after being added to the forbidden storage operation data structure; and update, based on the determining, the forbidden storage operation data structure that is accessible to the multiple compute nodes of the storage system.

16. The storage system according to claim 15 wherein the control module is configured to determine that the storage operation and the other storage operation are forbidden, and to determine that another storage operation is forbidden.

17. The storage system according to claim 15 wherein the control module is configured to obtain problem related statistics on the occurrences of the one or more problems, and apply one or more rules to determine whether to forbid the execution of one of the one of more storage operations.

18. The storage system according to claim 15 wherein the control module is configured to determine whether to forbid a certain type of storage operation.

19. The storage system according to claim 15 wherein the control module is configured to determine whether to forbid the storage operation when applied on one or more storage spaces of the storage system.

20. The storage system according to claim 15 wherein the control module is configured to determine whether to forbid the storage operation when applied on one or more objects.

21. The storage system according to claim 15 wherein the control module is configured to determine whether to forbid the storage operation when the storage operation utilizes one or more resources of the storage system.

22. The storage system according to claim 15 wherein the control module is configured to determine whether to forbid any storage operation when applied on one or more objects.

23. The storage system according to claim 15 wherein the control module is configured to determine whether to forbid any storage operation when utilizes one or more resources of the storage system.

24. The storage system according to claim 15 wherein the control module is configured to determine at least one frequency of occurrence of the one or more problems associated with the execution with one or more storage operations.

25. The storage system according to claim 15 wherein the control module is configured to determine whether to forbid the execution of the storage operation based on a risk or damage associated with a problem that occurred when executing the storage operation.

26. The storage system according to claim 15 wherein the control storage operation that is directly linked with a problem that occurred at the one or more compute nodes, and the other storage operation is not directly linked with any problem that occurred at the one or more compute nodes.

27. The storage system according to claim 15, comprising a compute node that is configured to deny an execution of a forbidden storage operation, wherein the compute node does not belong to the one or more compute nodes that generated the problem related information.

\* \* \* \* \*